Oct. 29, 1940.    C. ORT    2,220,021
RANGE FINDER
Filed April 4, 1940    2 Sheets-Sheet 1
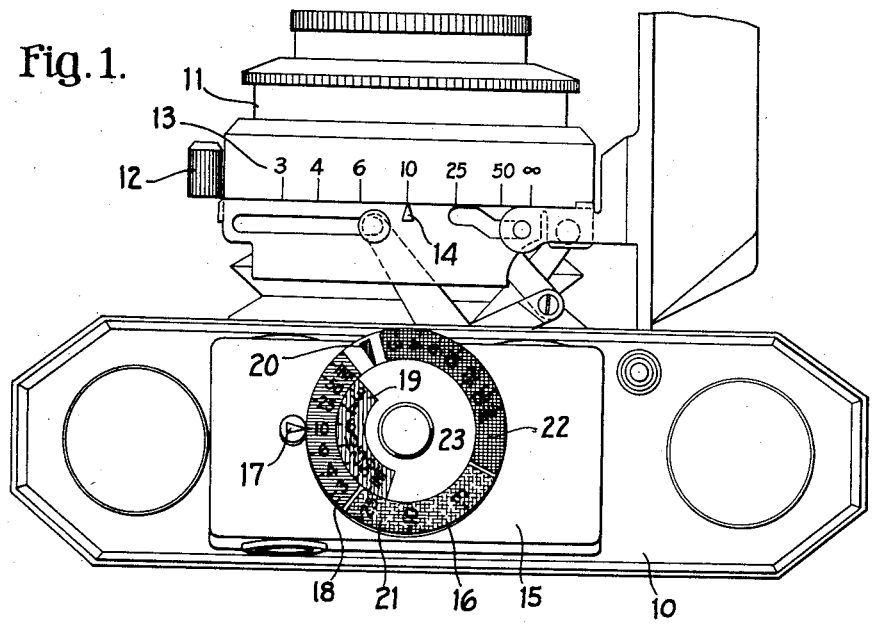
Fig. 2.
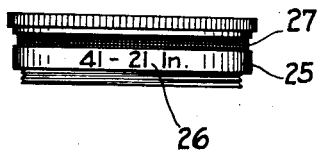
Fig. 3.
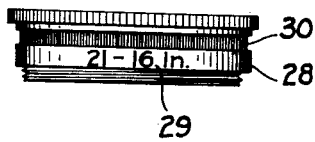
Fig. 4.
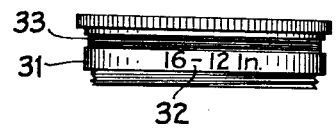
Fig. 5.
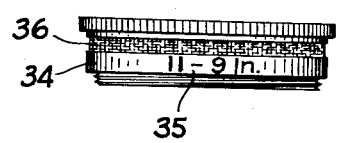
Inventor
Carl Ort
By Newton M. Perris
Attorney Oct. 29, 1940.                C. ORT                    2,220,021
                           RANGE FINDER
                      Filed April 4, 1940           2 Sheets-Sheet 2
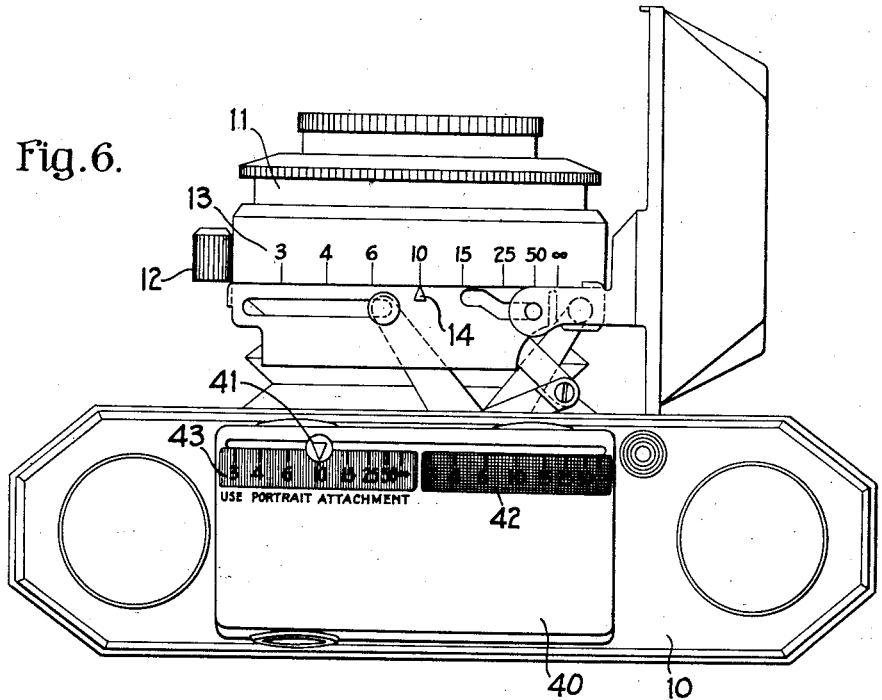
Fig. 7.
Inventor
Carl Ort
By
Attorney Patented Oct. 29, 1940

2,220,021

UNITED STATES PATENT OFFICE 2,220,021

RANGE FINDER

Carl Ort, Stuttgart, Germany, assignor to Eastman Kodak Company, Rochester, N. Y., a corporation of New Jersey Application April 4, 1940, Serial No. 327,849
In Germany March 7, 1939

8 Claims. (Cl. 95—44)

This invention relates to range finders and particularly to range finders adapted for use with photographic cameras.

It is an object of the invention to provide a range finder for use with a camera on which a portrait attachment has been mounted. Portrait attachments are usually single lenses of positive power which may be mounted in front of a photographic objective to permit focusing in a range closer than the normal range of the objective.

One embodiment of the invention is to provide a range finder for use with a camera alone over its normal range and for use with a camera having a portrait attachment over a closeup range.

It is the object of a preferred embodiment of the invention to provide a range finder which is adapted to be used with a plurality of interchangeable portrait attachments, which may be used either with a camera having no range finder, one having a built-in but not coupled range finder, or one having a coupled range finder to cover the normal focusing range.

As is well known, cameras are usually provided with a focusing scale on the lens mount or camera bed, which scale covers the normal focusing range of the camera from infinity to some near points, say 3 feet. If a portrait attachment is placed in front of the camera lens focused on infinity, the combination will be focused on some nearer point. A highly desirable arrangement would be one where the portrait attachment together with the lens focused on infinity forms a combination focused on 3 feet. The adjustment of the camera focusing mechanism would then permit focusing of the combination over a closeup range in which the far point is 3 feet (i. e. the near point of the normal range) and the near point is about 1½ feet. Additional or different attachments can be used to cover even closer ranges less than 1½ feet. If necessary, the arrangements may overlap but in every case, are defined by the range of the camera focusing scale.

When focusing a camera at different distances in a "closeup" range, the readings on the focusing scale do not correspond to actual distances and it would be necessary to use ground glass focusing or to have a conversion table giving scale readings in terms of actual focus distances when a certain power portrait attachment is used.

According to the present invention, a range finder is provided having at least a portion of its adjustment scale calibrated to correspond to a portrait attachment of given power and to give the correct setting of the camera focusing scale when such a portrait attachment is used over the camera lens. The invention also provides that each portion of the range finder scale carry some distinguishing indicia such as a unique color to indicate the lens combination to which that portion appertains.

The invention, its objects and advantages, will be more fully understood from the following description when read in connection with the accompanying drawings in which:

Fig. 1 shows a range finder according to my invention mounted on a camera and calibrated for use over four different closeup ranges.

Figs. 2, 3, 4, and 5 show the portrait attachments corresponding to the range finder of Fig. 1 and to be used over the camera objective of Fig. 1.

Fig. 6 shows a less preferred embodiment of my invention wherein the range finder is intended for use both with a portrait attachment and with the camera objective alone.

Fig. 7 shows the portrait attachment to be used with the range finder of Fig. 6.

In Fig. 1, a camera 10 is provided with an objective 11, means 12 for focusing the objective and a scale 13 with index 14 to indicate the focus of the objective 11 over its normal range. This camera may or may not have a built-in range finder for focusing over this normal range.

According to the invention, there is provided a range finder 15 tilted forward slightly to correct for parallax and provided with adjusting means 16 for operating the light deviating device of the range finder. Any type of range finder and any type of light deviating means may be used. In the arrangement shown, only the portion 16 is movable, the central portion 23 being rigidly connected to the housing of the range finder 15. The scale of the range finder adjusting mechanism 16 is made up of four portions 18, 19, 21 and 22. The scales 18, 21, and 22 rotate with the adjusting mechanism 15 and cooperate with a fixed index 17. The scale 19 is stationary and a moving index 20 on the adjusting mechanism 16 is provided therefor.

According to a preferred feature of the invention, these four scales are of distinguishing colors. I prefer to have the lettering itself colored, but such an arrangement cannot be shown easily in a drawing and therefore I have shown an alternative arrangement wherein black letters are used on colored backgrounds. As shown, the scale 22 is black, the scale 19 is red, the scale 18 is blue, and the scale 21 is yellow. Of course, one would not have black numbers on a black background hence the scale portion 22 is either white numbers on a black background or black numbers on a white or metallic background. Each of these portions of the adjusting scale corresponds to a full range of the normal focusing scale 13 or a portion thereof. Each portion also corresponds to a combination of the objective 11 and one of the portrait attachments shown in Figs. 2 to 5.

These portrait attachments 25, 28, 31, and 34 cover different closeup ranges shown by the figures 26, 29, 32 and 35 appearing respectively thereon. Each is also provided with a colored portion 27, 30, 33, or 36 having the same colors respectively as the corresponding portions of the adjusting scale of the range finder 15.

By way of example, Figs. 1 and 2 will be considered in detail. The normal focusing range of the camera 10 is from infinity to 3 feet as shown by the scale 13. When the portrait attachment 25 is mounted in front of the objective 11 to form a combination of relatively increased power, the focusing range of the camera is from 41 to 21 inches as indicated by the marking 26. The range finder 15 is so calibrated that the portion 22 of its adjustment scale gives the correct setting of the scale 13 when this portrait attachment 25 is mounted on the lens 11. In practice, a reading is taken with the range finder 15 and if it falls in the range of the scale portion 22, the color of this portion indicates that the portrait attachment 25 having the same color in the band 27 should be used and the focusing scale 13 should be set according to the reading on the scale portion 22.

With the actual arrangement as shown in Fig. 1, there is a slight overlapping of some of the scales. For example when the adjusting mechanism 16 is rotated so that 4 on the scale portion 22 comes opposite the index 17, the red index 20 comes roughly opposite 25 on the scale 19. This merely indicates that alternative arrangements are possible. That is, either the portrait attachment 25 can be used with the focusing scale 13 set at 4 or the portrait attachment 28 may be used with the focusing scale set at slightly less than 25.

Instead of using colors to correlate the portrait attachments with the portions of the adjusting scale on the range finder 15, any distinguishing indicia may be used. For example the marking 41—21 inches may be printed adjacent to the scale portion 22 to indicate that the portrait attachment 25 should be used. Another arrangement would involve having the words "Attachment 1," "Attachment 2," etc. printed adjacent to the scale portions and having the attachments correspondingly numbered.

In Figs. 6 and 7 there is shown a different embodiment wherein a range finder 40 has a sliding adjusting knob 41 bearing an index to be read against the scale portions 42 and 43. The scales are so arranged that the scale portion 42 corresponds to the camera focusing scale 13 and thus is calibrated in actual distances. The other portion 43 of the scale is colored differently and is labeled "Use portrait attachment." Since this arrangement covers only one closeup range in addition to the normal focusing arrangement, no distinguishing indicia are required on the portrait attachment 45.

The present invention is not limited to the type of range finder used, but may be applied to any range finder scale, provided the range finder covers a suitable range and may be extended to cover any number of portrait attachments or combinations of attachments. Having thus described two embodiments of the invention, I wish to point out that it is not limited to the embodiments shown but is of the scope of the appended claims.

What I claim and desire to secure by Letters Patent of the United States is:

1. A range finder adapted for use with a camera having an objective, a focusing scale and a plurality of auxiliary lenses for changing the power of the objective, said range finder having adjusting means and a scale for indicating the adjustment thereof, said scale including a portion corresponding to each of the auxiliary lenses, said portion being calibrated to give the correct setting of the focusing scale when the corresponding auxiliary lens is used on the objective.

2. A range finder according to claim 1 particularly adapted for use with a plurality of auxiliary lenses each bearing a distinguishing indicia, each portion of the range finder scale bearing a feature matching the distinguishing indicia of the corresponding auxiliary lens.

3. A range finder according to claim 1 adapted for use with a plurality of auxiliary lenses each bearing a different distinguishing color, each portion of the range finder scale being marked with the color borne by the corresponding auxiliary lens.

4. A range finder adapted for use with a camera having an objective, a focusing scale for the objective and at least one auxiliary lens for changing the power of the objective, said range finder having adjusting means and a scale therefor including a plurality of portions, each portion covering the full range of said focusing scale, one portion corresponding to the settings of the focusing scale for the objective alone, and another portion corresponding to said settings for the objective in combination with said auxiliary lens.

5. A range finder according to claim 4 in which the mount for said auxiliary lens has a distinguishing color and said another portion of the scale has the same distinguishing color.

6. A range finder adapted for closeup photography with a camera having an objective, means for focusing the camera through a normal range beyond the closeup region, a camera scale on the focusing means for indicating the focus setting throughout the normal range and a plurality of auxiliary lenses of different powers, each of which may be mounted in front of the objective to increase the power thereof whereby the focusing range of the combination of the auxiliary lens and the objective is in the closeup region and the settings on the camera scale reading in normal range units correspond to distances in this closeup region, said range finder being characterized by having adjusting means for operating the range finder throughout at least part of the closeup region and a scale for the operating means made up of a plurality of portions, each portion corresponding to one of the auxiliary lenses and being calibrated in said normal range units to give readings which correspond to the distances in the closeup region covered by said one of the auxiliary lenses combined with said camera objective.

7. A range finder according to claim 6 particularly adapted for use with a set of auxiliary lenses each bearing a distinguishing indicia said range finder being further characterized by each portion thereof having an indicia matching that of the corresponding auxiliary lens.

8. A range finder adapted for closeup photographic work with a camera having an objective, means for focusing the camera through a normal range beyond the closeup region, a camera scale on the focusing means indicating the focus setting throughout said normal range and a plurality of auxiliary lenses of different powers, with differently colored mounts, each of which may be mounted in front of the objective to increase the power thereof so that the focusing range of the combination of the auxiliary lens and the objective is in the closeup region and the settings on the camera scale reading in normal range units correspond to distances in this closeup region, said range finder being characterized by having adjusting means for operating the range finder throughout at least part of the closeup region and a scale for the operating means made up of a plurality of differently colored portions each portion corresponding in color to one of the auxiliary lenses and corresponding in calibration to said settings on the camera scale for the closeup focusing range of the combination of said one of the auxiliary lenses and the objective.

CARL ORT.